United States Patent
Yu et al.

(10) Patent No.: US 11,440,400 B2
(45) Date of Patent: Sep. 13, 2022

(54) LONGITUDINALLY PROVIDED VEHICLE DRIVING ASSEMBLY HAVING SINGLE POWER SOURCE

(71) Applicant: JING-JIN ELECTRIC TECHNOLOGIES CO., LTD., Beijing (CN)

(72) Inventors: Ping Yu, Beijing (CN); Jianwen Li, Beijing (CN); Ting Wang, Beijing (CN); Liang Hong, Beijing (CN)

(73) Assignee: JING-JIN ELECTRIC TECHNOLOGIES CO., LTD., Beijing (CN)

( * ) Notice: Subject to any disclaimer, the term of this patent is extended or adjusted under 35 U.S.C. 154(b) by 267 days.

(21) Appl. No.: 16/761,420

(22) PCT Filed: Jan. 14, 2019

(86) PCT No.: PCT/CN2019/071580
§ 371 (c)(1),
(2) Date: May 4, 2020

(87) PCT Pub. No.: WO2019/141145
PCT Pub. Date: Jul. 25, 2019

(65) Prior Publication Data
US 2020/0391588 A1     Dec. 17, 2020

(30) Foreign Application Priority Data

Jan. 19, 2018  (CN) .......................... 201820099656.7

(51) Int. Cl.
*B60K 17/02* (2006.01)
*B60K 17/08* (2006.01)
(Continued)

(52) U.S. Cl.
CPC .............. *B60K 17/02* (2013.01); *B60K 17/08* (2013.01); *B60K 7/0007* (2013.01); *B60K 2001/001* (2013.01)

(58) Field of Classification Search
CPC ...... B60K 17/02; B60K 17/08; B60K 7/0007; B60K 2001/001
See application file for complete search history.

(56) References Cited

U.S. PATENT DOCUMENTS

| 2,433,003 A | 12/1947 | Swennes |
| 4,723,643 A * | 2/1988 | Numazawa ........... B60W 10/06 192/48.607 |

(Continued)

FOREIGN PATENT DOCUMENTS

| CN | 86103135 A | 11/1986 |
| CN | 201390152 Y | 1/2010 |

(Continued)

OTHER PUBLICATIONS

Notice of Reasons for Refusal issued in Japanese Patent Application No. 2020-531627 dated Jul. 9, 2021.

(Continued)

*Primary Examiner* — Brian L Swenson
(74) *Attorney, Agent, or Firm* — Fox Rothschild LLP; Carol E. Thorstad-Forsyth

(57) ABSTRACT

The present disclosure discloses a longitudinally placed vehicle driving assembly having a single power source, which solves the technical problems of the vehicle driving assemblies in the prior art such as larger volumes and poor transmission performances. The driving assembly is connected to a transmission shaft or a vehicle axle half shaft of a vehicle and provided with an automatic transmission. The automatic transmission includes an input shaft (2). A power source (1) is connected to the input shaft (2). An output shaft (10) is provided coaxial with the input shaft (2). An inter- (Continued)

mediate shaft (9) is provided parallel to the input shaft (2). A first-stage reduction-gear train is installed through the input shaft (2) and the intermediate shaft (9). An Nth-stage reduction-gear train is installed through the intermediate shaft (9) and the output shaft (10), wherein N≥2. Each of the stages of the reduction-gear trains includes a pair of gears having a different transmission ratio. The output shaft (10) of the power source (1) and the input shaft (2) of the automatic transmission are integrally manufactured. A rear cover of the power source (1) and a front housing of the automatic transmission are integrated. The driving assembly is placed in the front of the vehicle, and drives rear wheels of the vehicle.

12 Claims, 2 Drawing Sheets

(51) Int. Cl.
*B60K 7/00* (2006.01)
*B60K 1/00* (2006.01)

(56) References Cited

U.S. PATENT DOCUMENTS

| | | | |
|---|---|---|---|
| 5,620,387 A * | 4/1997 | Janiszewski | B60K 1/00 475/207 |
| 2011/0031053 A1 * | 2/2011 | Carl | F16H 47/04 180/165 |
| 2013/0196812 A1 * | 8/2013 | Smemo | F16H 3/66 475/275 |
| 2016/0031310 A1 * | 2/2016 | Swales | B60K 6/48 903/905 |
| 2018/0304732 A1 | 10/2018 | Yu et al. | |
| 2019/0376588 A1 * | 12/2019 | Dahlbäck | F16H 3/44 |

FOREIGN PATENT DOCUMENTS

| | | |
|---|---|---|
| CN | 102371893 A | 3/2012 |
| CN | 104930137 A | 9/2015 |
| CN | 106882041 A | 6/2017 |
| CN | 206277947 U | 6/2017 |
| CN | 206678766 U | 11/2017 |
| CN | 207955335 U | 10/2018 |
| EP | 0203732 A1 | 12/1986 |
| EP | 3276203 A1 | 1/2018 |
| JP | 3427475 B2 | 7/2003 |
| JP | 2006224696 A | 8/2006 |
| WO | 2016192484 A1 | 12/2016 |

OTHER PUBLICATIONS

European Search Report issued in European Patent Application No. 19741086.3 dated Jul. 29, 2020.

International Search Report issued in PCT/CN2019/071580 dated Feb. 28, 2019.

* cited by examiner

LONGITUDINALLY PROVIDED VEHICLE DRIVING ASSEMBLY HAVING SINGLE POWER SOURCE

CROSS-REFERENCE TO RELATED APPLICATIONS

This application is a U.S. National Stage entry under 35 U.S.C. § 371 based on International Application No. PCT/CN2019/071580, entitled "LONGITUDINALLY PROVIDED VEHICLE DRIVING ASSEMBLY HAVING SINGLE POWER SOURCE", filed on Jan. 14, 2019, which claims priority to Chinese Patent Application No. 201820099656.7, filed on Jan. 19, 2018. The contents of which are incorporated herein by reference in their entirety.

TECHNICAL FIELD

The present disclosure relates to a longitudinally placed vehicle driving assembly having a single power source, connected to a transmission shaft or a vehicle axle half shaft of a vehicle, for driving the vehicle.

BACKGROUND

Currently the driving assemblies of cars are developing in the trends of integration, light weighting and electrification. In conventional car driving assemblies, the power source and the automatic transmission are usually provided in a separated form, which occupies a large space in the vehicle, which is adverse to the development of the driving assemblies in the trends of miniaturization and light weighting.

Furthermore, the output shaft of the power source and the input shaft of the automatic transmission are connected by a shaft coupling. They are subjected to a large impact therebetween, which reduces the transmission performance.

SUMMARY

Aiming at the above problems in the prior art, the present disclosure provides a longitudinally placed vehicle driving assembly having a single power source, wherein the rear cover of the power source and the front housing of the automatic transmission are integrated, thereby reducing the volume of the driving assembly, and the output shaft of the power source and the input shaft of the automatic transmission are integrally manufactured, thereby improving the transmission performance.

To achieve the above objects, the technical solutions of the present disclosure are realized as follows:

The present disclosure provides a longitudinally placed vehicle driving assembly having a single power source, connected to a transmission shaft or a vehicle axle half shaft of a vehicle, provided with an automatic transmission, wherein the automatic transmission comprises an input shaft, a power source is connected to the input shaft, an output shaft is provided coaxial with the input shaft, and an intermediate shaft is provided parallel to the input shaft; and a first-stage reduction-gear train is installed through the input shaft and the intermediate shaft, an Nth-stage reduction-gear train is installed through the intermediate shaft and the output shaft, N≥2, and each of the stages of the reduction-gear trains comprises a pair of gears having a different transmission ratio; wherein the output shaft of the power source and the input shaft of the automatic transmission are integrally manufactured, a rear cover of the power source and a front housing of the automatic transmission are integrated, and the driving assembly is placed in the front of the vehicle, and drives rear wheels of the vehicle.

Preferably, the first-stage reduction-gear train comprises an upper gear and a lower gear, the upper gear is fixedly connected to the input shaft of the automatic transmission via a key, the lower gear is fixedly connected to the intermediate shaft of the automatic transmission via a key, and a shifting clutch is provided between the upper gear and the input shaft of the automatic transmission.

Preferably, the shifting clutch is of an electromagnetically driving mode, and comprises a fixed fluted disc, a movable fluted disc and a power winding, the fixed fluted disc and the upper gear are integrated, the movable fluted disc is fixedly connected to the output shaft of the automatic transmission via a key, and when the power winding is electrified, the movable fluted disc moves axially along the output shaft of the automatic transmission to engage with the fixed fluted disc.

Preferably, the Nth-stage reduction-gear train comprises an upper gear and a lower gear, the upper gear is fixedly connected to the output shaft of the automatic transmission via a key, the lower gear is loosely nested on the intermediate shaft of the automatic transmission, and a shifting clutch is provided between the lower gear and the intermediate shaft of the automatic transmission.

Preferably, the shifting clutch is of an electromagnetically driving mode, and comprises a fixed fluted disc, a movable fluted disc and a power winding, the fixed fluted disc and the lower gear are integrated, the movable fluted disc is fixedly connected to the intermediate shaft of the automatic transmission via a key, and when the power winding is electrified, the movable fluted disc moves axially along the intermediate shaft of the automatic transmission to engage with the fixed fluted disc.

Preferably, the Nth-stage reduction-gear train comprises an upper gear and a lower gear, the upper gear is loosely nested on the output shaft of the automatic transmission, the lower gear is fixedly connected to the intermediate shaft of the automatic transmission via a key, and a shifting clutch is provided between the upper gear and the output shaft of the automatic transmission.

Preferably, the shifting clutch is of an electromagnetically driving mode, and comprises a fixed fluted disc, a movable fluted disc and a power winding, the fixed fluted disc and the upper gear are integrated, the movable fluted disc is fixedly connected to the output shaft of the automatic transmission via a key, and when the power winding is electrified, the movable fluted disc moves axially along the output shaft of the automatic transmission to engage with the fixed fluted disc.

Preferably, all of teeth or tooth spaces of the fixed fluted disc and tooth spaces or teeth of the movable fluted disc are rectangular.

Preferably, the power winding is a sector-shaped winding, a semi-circular winding or a ring winding.

The driving assembly, by employing the above structure configuration, has the following advantages:

In the present disclosure, the rear cover of the power source and the front housing of the automatic transmission are integrated, thereby reducing the volume of the driving assembly, to enable the volume of the car to be designed to be smaller.

In the present disclosure, the output shaft of the power source and the input shaft of the automatic transmission are integrally manufactured, thereby improving the transmission performance, and improving the driving efficiency of the car.

Figure 1:
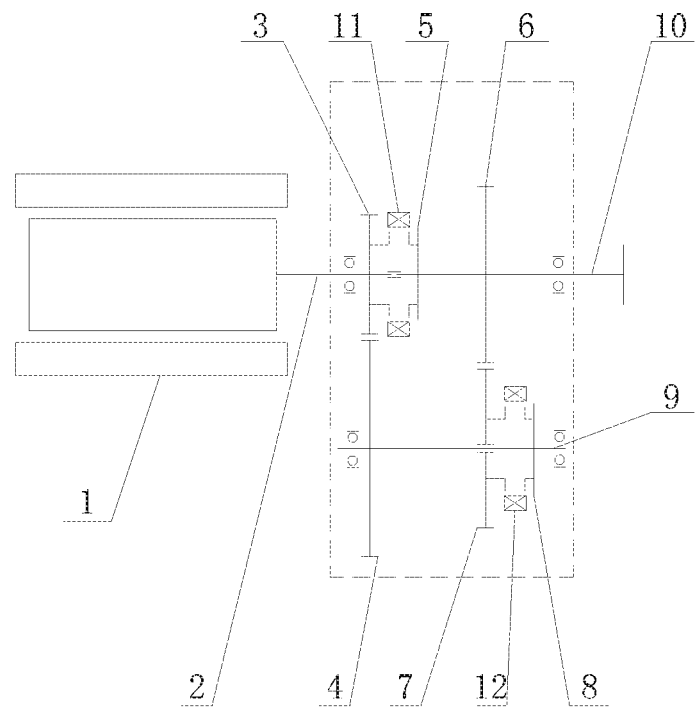
FIG. 1 is a schematic structural diagram of the first embodiment of the present disclosure.

In the drawings: 1. power source; 2. input shaft; 3. first gear; 4. second gear; 5. first movable fluted disc; 6. third gear; 7. fourth gear; 8. second movable fluted disc; 9. intermediate shaft; 10. output shaft; 11. first power winding; 12. second power winding;

13. fifth gear; 14. sixth gear; 15. third power winding; 16. third movable fluted disc;

17. seventh gear; 18. eighth gear; 19. fourth power winding; and 20. fourth movable fluted disc.

DETAILED DESCRIPTION

In order to make the objects, the technical solutions and the advantages of the present disclosure clearer, the embodiments of the present disclosure will be described below in further detail in conjunction with the drawings.

The First Embodiment

FIG. 1 shows the first embodiment of the present disclosure. In the present embodiment, a longitudinally placed vehicle driving assembly having a single power source is connected to a transmission shaft or a vehicle axle half shaft of a vehicle, and provided with an automatic transmission. The automatic transmission comprises an input shaft 2. A power source 1 is connected to the input shaft 2. An output shaft 10 is provided coaxial with the input shaft 2. An intermediate shaft 9 is provided parallel to the input shaft 2.

The term "longitudinally placed" refers to that all of the axial direction of the output shaft of the power source 1 and the axial directions of the input shaft 2, the intermediate shaft 9 and the output shaft 10 of the automatic transmission are in the direction of the length (the front-rear direction) of the vehicle.

The power source 1 may be an internal combustion engine or an electric motor, preferably an electric motor.

A first-stage reduction-gear train is installed through the input shaft 2 and the intermediate shaft 9, a second-stage reduction-gear train is installed through the intermediate shaft 9 and the output shaft 10, and each of the stages of the reduction-gear trains comprises a pair of gears having a different transmission ratio.

The output shaft of the power source 1 and the input shaft 2 of the automatic transmission are integrally manufactured. The rear cover of the power source 1 (the side of the power source 1 where the output shaft protrudes) and the front housing of the automatic transmission (the side where the input shaft 2 protrudes) are integrated. The driving assembly is placed in the front of the vehicle, and drives rear wheels of the vehicle. Therefore, "connected to the vehicle axle half shaft" means the rear axle.

The driving assembly may be connected to the transmission shaft of the vehicle, the transmission shaft of the vehicle is connected to the main speed reducer, the main speed reducer is connected to the vehicle axle half shaft, and a differential is provided in the main speed reducer.

The driving assembly may also be directly connected to the vehicle axle half shaft.

As shown in FIG. 1, the first-stage reduction-gear train comprises a first gear 3 and a second gear 4. The first gear 3 is fixedly connected to the input shaft 2 of the automatic transmission via a key. The second gear 4 is fixedly connected to the intermediate shaft 9 of the automatic transmission via a key. A first shifting clutch is provided between the first gear 3 and the input shaft 2 of the automatic transmission.

The above keys may be a spline, a flat key and so on.

The first shifting clutch is of an electromagnetically driving mode, and comprises a fixed fluted disc, a first movable fluted disc 5 and a first power winding 11. The fixed fluted disc and the first gear 3 are integrated. The first movable fluted disc 5 is fixedly connected to the output shaft 10 of the automatic transmission via a key. When the first power winding 11 is electrified, the first movable fluted disc 5 moves axially along the output shaft 10 of the automatic transmission to engage with the fixed fluted disc.

As shown in FIG. 1, the second-stage reduction-gear train comprises a third gear 6 and a fourth gear 7. The third gear 6 is fixedly connected to the output shaft 10 of the automatic transmission via a key. The fourth gear 7 is loosely nested on the intermediate shaft 9 of the automatic transmission. A second shifting clutch is provided between the fourth gear 7 and the intermediate shaft 9 of the automatic transmission.

The second shifting clutch is of an electromagnetically driving mode, and comprises a fixed fluted disc, a second movable fluted disc 8 and a second power winding 12. The fixed fluted disc and the fourth gear 7 are integrated. The second movable fluted disc 8 is fixedly connected to the intermediate shaft 9 of the automatic transmission via a key. Both of the second movable fluted disc 8 and the second power winding 12 are located on the right side of the fourth gear 7.

When the second power winding 12 is electrified, the second movable fluted disc 8 moves axially along the intermediate shaft 9 of the automatic transmission to engage with the fixed fluted disc.

In the present embodiment, the fixed fluted disc is provided with contrate teeth, and correspondingly the movable fluted disc is provided with contrate-tooth spaces. The fixed fluted disc may also be provided with tooth spaces, and correspondingly the movable fluted disc is provided with contrate teeth. All of the cross sections of those engaging teeth and tooth spaces are rectangular.

In the present embodiment, both of the first power winding 11 and the second power winding 12 are ring windings.

The power transmission modes of the driving assembly are as follows:

When the first shifting clutch is engaged and the second shifting clutch is disengaged, the power source transmits power via sequentially the input shaft 2, the first gear 3, the first movable fluted disc 5 and the output shaft 10 to the transmission shaft of the vehicle. That is the first working condition.

When the first shifting clutch is disengaged and the second shifting clutch is engaged, the power source transmits power via sequentially the input shaft 2, the first gear 3, the second gear 4, the intermediate shaft 9, the second movable fluted disc 8, the fourth gear 7, the third gear 6 and the output shaft 10 to the transmission shaft of the vehicle. That is the second working condition.

When both of the first shifting clutch and the second shifting clutch are disengaged, the power of the power source is completely cut off. That is the third working condition.

The Second Embodiment

Figure 2:
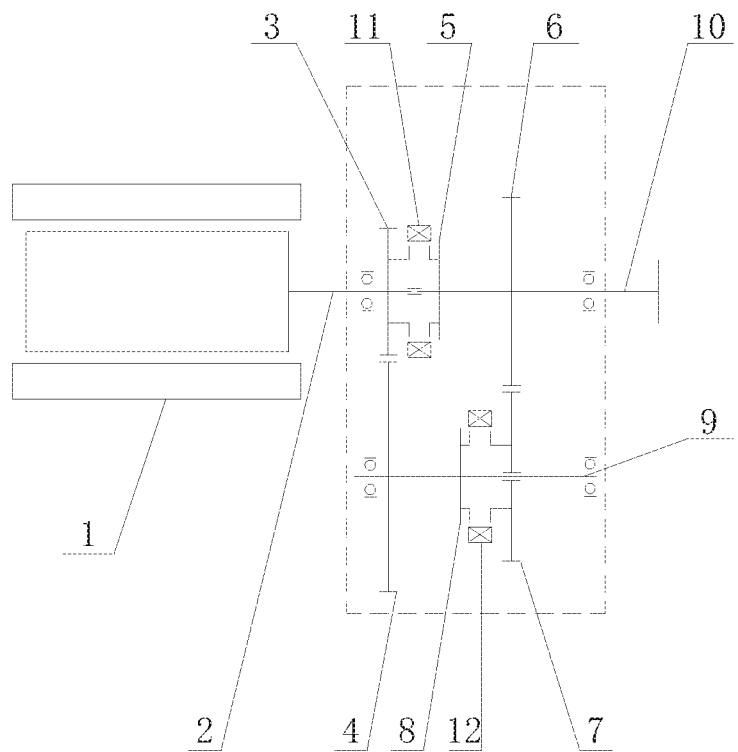
FIG. 2 is a schematic structural diagram of the second embodiment of the present disclosure.

FIG. 2 shows the second embodiment of the present disclosure. The present embodiment is an improvement made on the basis of the first embodiment, and differs from the first embodiment in that the shifting clutch provided between the fourth gear 7 and the intermediate shaft 9 of the automatic transmission comprises a fixed fluted disc, a second movable fluted disc 8 and a second power winding 12, the fixed fluted disc and the fourth gear 7 are integrated, the second movable fluted disc 8 is fixedly connected to the intermediate shaft 9 of the automatic transmission via a key, and both of the second movable fluted disc 8 and the second power winding 12 are located on the left side of the fourth gear 7.

When the second power winding 12 is electrified, the second movable fluted disc 8 moves axially along the intermediate shaft 9 of the automatic transmission to engage with the fixed fluted disc.

In the present embodiment, the first power winding 11 may be a ring winding, and the second power winding 12 is a sector-shaped winding or a semi-circular winding.

The other structures of the driving assembly of the present embodiment are the same as those of the first embodiment, and are not described repeatedly here.

The Third Embodiment

Figure 3:
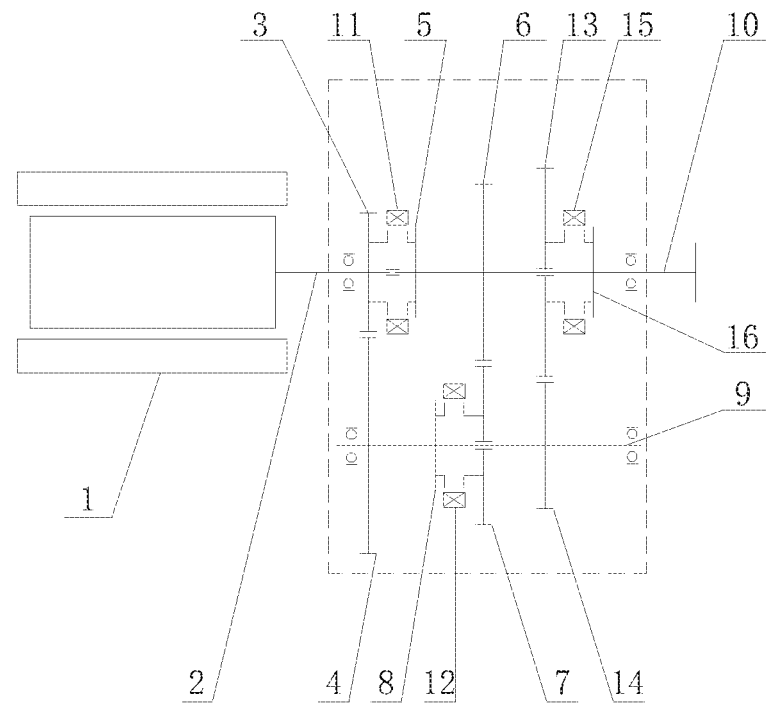
FIG. 3 is a schematic structural diagram of the third embodiment of the present disclosure.

FIG. 3 shows the third embodiment of the present disclosure. The present embodiment is an improvement made on the basis of the second embodiment, and differs from the second embodiment in that the automatic transmission is further provided with a third-stage reduction-gear train.

As shown in FIG. 3, the third-stage reduction-gear train comprises a fifth gear 13 and a sixth gear 14. The fifth gear 13 is loosely nested on the output shaft 10 of the automatic transmission. The sixth gear 14 is fixedly connected to the intermediate shaft 9 of the automatic transmission via a key. A third shifting clutch is provided between the fifth gear 13 and the output shaft 10 of the automatic transmission.

The third shifting clutch is of an electromagnetically driving mode, and comprises a fixed fluted disc, a third movable fluted disc 16 and a third power winding 15. The fixed fluted disc and the fifth gear 13 are integrated. The third movable fluted disc 16 is fixedly connected to the output shaft 10 of the automatic transmission via a key. When third power winding 15 is electrified, the third movable fluted disc 16 moves axially along the output shaft 10 of the automatic transmission to engage with the fixed fluted disc.

The power transmission modes of the driving assembly are as follows:

When the first shifting clutch is engaged and both of the second shifting clutch and the third shifting clutch are disengaged, the power source transmits power via sequentially the input shaft 2, the first gear 3, the first movable fluted disc 5 and the output shaft 10 to the transmission shaft of the vehicle. That is the first working condition.

When the first shifting clutch is disengaged, the second shifting clutch is engaged and the third shifting clutch is disengaged, the power source transmits power via sequentially the input shaft 2, the first gear 3, the second gear 4, the intermediate shaft 9, the second movable fluted disc 8, the fourth gear 7, the third gear 6 and the output shaft 10 to the transmission shaft of the vehicle. That is the second working condition.

When both of the first shifting clutch and the second shifting clutch are disengaged and the third shifting clutch is engaged, the power source transmits power via sequentially the input shaft 2, the first gear 3, the second gear 4, the intermediate shaft 9, the sixth gear 14, the fifth gear 13, the third movable fluted disc 16 and the output shaft 10 to the transmission shaft of the vehicle. That is the third working condition.

When all of the first shifting clutch, the second shifting clutch and the third shifting clutch are disengaged, the power of the power source is completely cut off. That is the fourth working condition.

The other structures of the driving assembly of the present embodiment are the same as those of the second embodiment, and are not described repeatedly here.

The Fourth Embodiment

Figure 4:
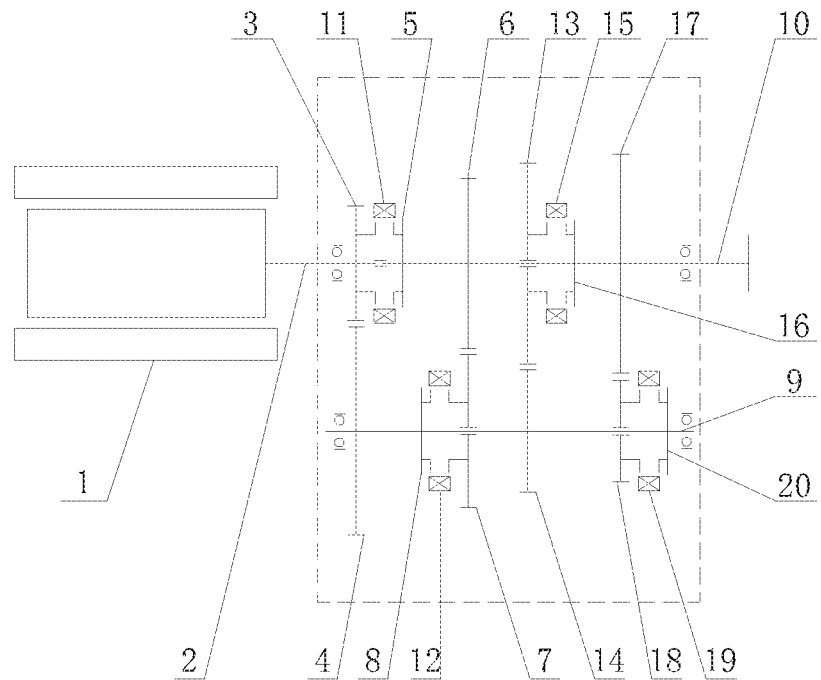
FIG. 4 is a schematic structural diagram of the fourth embodiment of the present disclosure.

FIG. 4 shows the fourth embodiment of the present disclosure. The present embodiment is an improvement made on the basis of the third embodiment, and differs from the third embodiment in that the automatic transmission is further provided with a fourth-stage reduction-gear train.

As shown in FIG. 4, the fourth-stage reduction-gear train comprises a seventh gear 17 and an eighth gear 18. The seventh gear 17 is fixedly connected to the output shaft 10 of the automatic transmission via a key. The eighth gear 18 is loosely nested on the intermediate shaft 9 of the automatic transmission. A fourth shifting clutch is provided between the eighth gear 18 and the intermediate shaft 9 of the automatic transmission.

The fourth shifting clutch is of an electromagnetically driving mode, and comprises a fixed fluted disc, a fourth movable fluted disc 20 and a fourth power winding 19. The fixed fluted disc and the eighth gear 18 are integrated. The second movable fluted disc 8 is fixedly connected to the intermediate shaft 9 of the automatic transmission via a key. Both of the fourth movable fluted disc 20 and the fourth power winding 19 are located on the right side of the eighth gear 18.

When the fourth power winding 19 is electrified, the fourth movable fluted disc 20 moves axially along the intermediate shaft 9 of the automatic transmission to engage with the fixed fluted disc.

The power transmission modes of the driving assembly are as follows:

When the first shifting clutch is engaged and all of the second shifting clutch, the third shifting clutch and the fourth shifting clutch are disengaged, the power source transmits power via sequentially the input shaft 2, the first gear 3, the first movable fluted disc 5 and the output shaft 10 to the transmission shaft of the vehicle. That is the first working condition.

When the first shifting clutch is disengaged, the second shifting clutch is engaged and both of the third shifting clutch and the fourth shifting clutch are disengaged, the power source transmits power via sequentially the input shaft 2, the first gear 3, the second gear 4, the intermediate shaft 9, the second movable fluted disc 8, the fourth gear 7, the third gear 6 and the output shaft 10 to the transmission shaft of the vehicle. That is the second working condition.

When both of the first shifting clutch and the second shifting clutch are disengaged, the third shifting clutch is engaged and the fourth shifting clutch is disengaged, the power source transmits power via sequentially the input shaft 2, the first gear 3, the second gear 4, the intermediate shaft 9, the sixth gear 14, the fifth gear 13, the third movable fluted disc 16 and the output shaft 10 to the transmission shaft of the vehicle. That is the third working condition.

When all of the first shifting clutch, the second shifting clutch and the third shifting clutch are disengaged and the fourth shifting clutch is engaged, the power source transmits power via sequentially the input shaft 2, the first gear 3, the second gear 4, the intermediate shaft 9, the fourth movable fluted disc 20, the eighth gear 18, the seventh gear 17 and the output shaft 10 to the transmission shaft of the vehicle. That is the fourth working condition.

When all of the first shifting clutch, the second shifting clutch, the third shifting clutch and the fourth shifting clutch are disengaged, the power of the power source is completely cut off. That is the fifth working condition.

The other structures of the driving assembly of the present embodiment are the same as those of the third embodiment, and are not described repeatedly here.

The above embodiments provide cases in which the automatic transmission is provided with two stages of reduction gear trains, three stages of reduction gear trains and four stages of the reduction gear trains. However, the present disclosure may also be extended to more stages of reduction-gear trains, the particular structures of which can be provided by referring to the above embodiments, and are not described in detail here.

The above are merely particular embodiments of the present disclosure. By the teaching of the present disclosure, a person skilled in the art can make other modifications or variations on the basis of the above embodiments. A person skilled in the art should understand that, the above particular descriptions are only for the purpose of better interpreting the present disclosure, and the protection scope of the present disclosure should be subject to the protection scope of the claims.

What is claimed is:

1. A longitudinally placed vehicle driving assembly having a single power source, connected to a transmission shaft or a vehicle axle half shaft of a vehicle, provided with an automatic transmission, wherein the automatic transmission comprises an input shaft, a power source is connected to the input shaft, an output shaft is provided coaxial with the input shaft, and an intermediate shaft is provided parallel to the input shaft; and a first-stage reduction-gear train is installed between the input shaft and the intermediate shaft, an Nth-stage reduction-gear train is installed between the intermediate shaft and the output shaft, N≥2, and each of the stages of the reduction-gear trains comprises a pair of gears having a different transmission ratio; wherein
the driving assembly is placed in the front of the vehicle, and drives rear wheels of the vehicle,
the first-stage reduction-gear train comprises an upper gear and a lower gear, the upper gear is fixedly connected to the input shaft of the automatic transmission via a key, the lower gear is fixedly connected to the intermediate shaft of the automatic transmission via a key, and a shifting clutch is provided between the upper gear and the input shaft of the automatic transmission.

2. The longitudinally placed vehicle driving assembly having a single power source according to claim 1, wherein the shifting clutch is of an electromagnetically driving mode, and comprises a fixed fluted disc, a movable fluted disc and a power winding, the fixed fluted disc and the upper gear are integrated, the movable fluted disc is fixedly connected to the output shaft of the automatic transmission via a key, and when the power winding is electrified, the movable fluted disc moves axially along the output shaft of the automatic transmission to engage with the fixed fluted disc.

3. The longitudinally placed vehicle driving assembly having a single power source according to claim 2, wherein all of teeth or tooth spaces of the fixed fluted disc and tooth spaces or teeth of the movable fluted disc are rectangular.

4. The longitudinally placed vehicle driving assembly having a single power source according to claim 2, wherein the power winding is a sector-shaped winding, a semi-circular winding or a ring winding.

5. The longitudinally placed vehicle driving assembly having a single power source according to claim 1, wherein the Nth-stage reduction-gear train comprises an upper gear and a lower gear, the upper gear is fixedly connected to the output shaft of the automatic transmission via a key, the lower gear is loosely nested on the intermediate shaft of the automatic transmission, and a shifting clutch is provided between the lower gear and the intermediate shaft of the automatic transmission.

6. The longitudinally placed vehicle driving assembly having a single power source according to claim 5, wherein the shifting clutch is of an electromagnetically driving mode, and comprises a fixed fluted disc, a movable fluted disc and a power winding, the fixed fluted disc and the lower gear are integrated, the movable fluted disc is fixedly connected to the intermediate shaft of the automatic transmission via a key, and when the power winding is electrified, the movable fluted disc moves axially along the intermediate shaft of the automatic transmission to engage with the fixed fluted disc.

7. The longitudinally placed vehicle driving assembly having a single power source according to claim 6, wherein all of teeth or tooth spaces of the fixed fluted disc and tooth spaces or teeth of the movable fluted disc are rectangular.

8. The longitudinally placed vehicle driving assembly having a single power source according to claim 6, wherein the power winding is a sector-shaped winding, a semi-circular winding or a ring winding.

9. The longitudinally placed vehicle driving assembly having a single power source according to claim 1, wherein the Nth-stage reduction-gear train comprises an upper gear and a lower gear, the upper gear is loosely nested on the output shaft of the automatic transmission, the lower gear is fixedly connected to the intermediate shaft of the automatic transmission via a key, and a shifting clutch is provided between the upper gear and the output shaft of the automatic transmission.

10. The longitudinally placed vehicle driving assembly having a single power source according to claim 9, wherein the shifting clutch is of an electromagnetically driving mode, and comprises a fixed fluted disc, a movable fluted disc and a power winding, the fixed fluted disc and the upper gear are integrated, the movable fluted disc is fixedly connected to the output shaft of the automatic transmission via a key, and when the power winding is electrified, the movable fluted disc moves axially along the output shaft of the automatic transmission to engage with the fixed fluted disc.

11. The longitudinally placed vehicle driving assembly having a single power source according to claim 10, wherein all of teeth or tooth spaces of the fixed fluted disc and tooth spaces or teeth of the movable fluted disc are rectangular.

12. The longitudinally placed vehicle driving assembly having a single power source according to claim 10, wherein the power winding is a sector-shaped winding, a semi-circular winding or a ring winding.

* * * * *